(12) United States Patent
Ulmer et al.

(10) Patent No.: US 7,874,060 B2
(45) Date of Patent: Jan. 25, 2011

(54) METHOD OF MAKING OPTICS ELEMENT

(75) Inventors: Melville P. Ulmer, Evanston, IL (US); Michael E. Graham, Evanston, IL (US); Semyon Vaynman, Evanston, IL (US)

(73) Assignee: Northwestern University, Evanston, IL (US)

( * ) Notice: Subject to any disclaimer, the term of this patent is extended or adjusted under 35 U.S.C. 154(b) by 1575 days.

(21) Appl. No.: 11/165,610

(22) Filed: Jun. 23, 2005

(65) Prior Publication Data

US 2006/0181743 A1 Aug. 17, 2006

Related U.S. Application Data (60) Provisional application No. 60/582,723, filed on Jun. 24, 2004.

(51) Int. Cl.
*B23P 17/00* (2006.01)
*G02B 7/182* (2006.01)

(52) U.S. Cl. .......................... 29/527.2; 29/458; 29/460; 359/846; 359/848; 359/883

(58) Field of Classification Search ................. 29/458, 29/460, 527.2; 359/846, 848, 883
See application file for complete search history.

(56) References Cited

U.S. PATENT DOCUMENTS

| | | | | |
|---|---|---|---|---|
| 3,317,640 A | * | 5/1967 | Jones | 264/2.7 |
| 3,976,890 A | * | 8/1976 | Barnes et al. | 359/883 |
| 4,124,277 A | * | 11/1978 | Stang | 359/846 |
| 4,255,364 A | * | 3/1981 | Talbert | 264/1.9 |
| 4,268,124 A | * | 5/1981 | Lui | 359/848 |
| 4,311,729 A | | 1/1982 | Itakura et al. | 427/80 |
| 4,357,286 A | * | 11/1982 | Stalcup et al. | 264/1.21 |
| 4,451,119 A | * | 5/1984 | Meyers et al. | 359/846 |
| 4,781,870 A | * | 11/1988 | Talbert | 264/1.9 |
| 4,814,232 A | * | 3/1989 | Bluege et al. | 428/450 |
| 4,821,282 A | * | 4/1989 | Podgorski | 372/99 |
| 4,826,553 A | * | 5/1989 | Armitage et al. | 156/233 |
| 4,865,451 A | * | 9/1989 | Ahonen et al. | 356/469 |
| 5,208,704 A | * | 5/1993 | Zito | 359/848 |
| 5,405,704 A | | 4/1995 | Waibel et al. | 428/472 |
| 5,424,876 A | * | 6/1995 | Fujii | 359/884 |

(Continued)

FOREIGN PATENT DOCUMENTS

WO    WO 9502199 A1 * 1/1995

OTHER PUBLICATIONS

Nelson, "Design concepts for the California Extremely Large Telescope (CELT)," Proc. SPIE, vol. 4004, Telescope Structures, Enclosures, Controls, Assembly/Integration/Validation, and Commissioning, Aug. 2000, pp. 282-289.

(Continued)

*Primary Examiner*—Essama Omgba (57) ABSTRACT

An optics element, such as an optical, IR, or X-ray mirror or mirror segment, is made by a combination of replication and lamination by depositing a first metallic layer on a replicating surface of a master or mandrel, depositing a light weight backing layer that adheres on the first metallic layer, and depositing a cover layer that adheres on the backing layer whereby the optics element comprises an in-situ deposited composite lamination of the first metallic layer, the backing layer, and the cover layer.

13 Claims, 2 Drawing Sheets

U.S. PATENT DOCUMENTS

| | | | | | |
|---|---|---|---|---|---|
| 5,576,884 | A | * | 11/1996 | Ise et al. | 359/514 |
| 5,583,704 | A | * | 12/1996 | Fujii | 359/884 |
| 5,617,262 | A | * | 4/1997 | Ise et al. | 359/846 |
| 5,623,375 | A | * | 4/1997 | Floch et al. | 359/883 |
| 5,640,282 | A | * | 6/1997 | Ise et al. | 359/846 |
| 6,749,309 | B1 | * | 6/2004 | Kaplan et al. | 359/883 |
| 7,037,595 | B1 | * | 5/2006 | Andre et al. | 428/632 |
| 7,188,964 | B2 | * | 3/2007 | Ealey | 359/849 |
| 7,192,145 | B2 | * | 3/2007 | Ealey | 359/849 |
| 7,192,623 | B2 | * | 3/2007 | Andre et al. | 427/162 |
| 7,195,361 | B2 | * | 3/2007 | Ealey | 359/849 |
| 2006/0092535 | A1 | * | 5/2006 | Romeo | 359/883 |
| 2006/0158753 | A1 | * | 7/2006 | Ealey | 359/849 |
| 2006/0251904 | A1 | * | 11/2006 | Ealey | 428/426 |

OTHER PUBLICATIONS

Angel et al., "The 20/20 telescope:MCAO imaging at the individual and combined foci," Beyond Conventional Adaptive Optics, Proc. ESO, Venice, (http://caao.as.arizona.edu/publications/venice2020.pdf), 2001, pp. 1-10.

Andersen et al., "Concepts for Dual Conjugate Adaptive Optics for the Swedish 50m Extremely Large Telescope," Beyond Conventional Adaptive Optics, Proc. ESO, Venice, (http:www.astro.lu.se/~torben/euro50/), 2001, pp. 1-3.

Dierickx et al., "Progress of the OWL 100-m telescope conceptual design," Proc. SPIE, vol. 4004, Telescope Structures, Enclosures, Controls, Assembly/Integration/Validation, and Commissioning, Aug. 2000, pp. 290-299.

Nelson, "Overview of the performance of the W.M. Keck Observatory," Proc. SPIE, vol. 2199, Advanced Technology Optical Telescopes V, Jun. 1994, pp. 82-93.

Adams et al., "Performance testing of the Hobby-Eberly Telescope primary mirror array," Proc. SPIE vol. 4004, Telescope Structures, Enclosures, Controls, Assembly/Integration/Validation, and Commissioning, Aug. 2000, pp. 471-481.

Ulmer et al., "Large Telescope Project Dedicated to an Origins Survey," Proc. SPIE, vol. 5382, Extremely Large Telescopes, 2004, pp. 193-204.

Zuther, Basic Principles of Adaptive Optics, World Wide Web, (http://www.phi.uni-koeln.de/workgroups/obs_astronomy/ao-sample/introAO. %/html#top), 2000-2002.

Max, Center for Adaptive Optics, World Wide Web, (http://cfao.ucolick.org/ao/index.shtml), 2000-2002, 1 page.

Rakoczy et al., "Recent enhancements of the Phased Array Mirror Extendible Large Aperture (PAMELA) telescope testbed at MSFC," Proc. SPIE, vol. 4004, Telescope Structures, Enclosures, Controls, Assembly/Integration/Validation, and Commissioning, Aug. 2000, pp. 352-362.

Denton et al., "Replication of Optical Surfaces: Capabilities and Cautions," Proc. of: Precision Fabrication and Replication, ASPE, 1999.

Valenzuela et al., "Cost Effective Ultra Light Weight Mirrors," World Wide Web, (http://origins.jpl.nasa.gov/meetings/ulsoc/papers/valenzuela.pdf), 2000-2002, pp. 1-8.

Redmon, "Electroformed Nickel Mirrors for NGST," World Wide Web, (http://www.ngst.nasa.gov/project/Groups/Technology/bin/redmon.pdf), 1997-2002, pp. 1-19.

Ila, "Production of Ultra Light-Weight Mirrors," World Wide Web, (http://cim.aamu.edu/Activities/pulm_lab.htm), 2001-2002.

Citterio et al., "Development of soft and hard x-ray optics for astronomy: progress report II and considerations on material properties for large-diameter segmented optics of future missions," Proc. SPIE vol. 4496, X-ray Optics for Astronomy: Telescopes, Multilayers, Spectrometers, and Missions, Jan. 2002, pp. 23-40.

Aschenbach, "In-orbit performance of the XMM-Newton x-ray telescopes: images and spectra," Proc. SPIE vol. 4496, X-ray Optics for Astronomy: Telescopes, Multilayers, Spectrometers, and Missions, Jan. 2002, pp. 8-22.

Ulmer et al., "Production and performance of multilayer coated conic sections," Proc. SPIE, vol. 4496, X-ray Optics for Astronomy: Telescopes, Multilayers, Spectrometers, and Missions, Jan. 2002, pp. 127-133.

Heimann et al., "Novel methods for shaping thin-foil optics for x-ray astronomy," Proc. SPIE, vol. 4496, X-ray Optics for Astronomy Telescopes, Multilayers, Spectrometers, and Missions, Jan. 2002, pp. 62-72.

Romeo et al., "Ultralightweight and hyperthin rollable primary mirror for space telescopes," Proc. SPIE, vol. 4013, UV, Optical, and IR Space Telescopes and Instruments, Jul. 2000, pp. 634-639.

Willingale et al, "XEUS Mirror Technology," World Wide Web, (http://astro.esa.int/SA-general/Projects/XEUS/technology/technology_04.%html), 1999-20002.

Ulmer et al., "Deformable x-ray optics for solar physics," Proc SPIE, 5171, 2004, pp. 269-279.

van Belle, "W.M.Keck Telescope Data," World Wide Web, (http://huey.jpl.nasa.gov/~gerard/work_tour/keck_data.html), 1996-2002.

Chanan, "Phasing The Keck Telescope," World Wide Web, (http://www.ps.uci.edu/physics/news/chanan.html), 1998-2002, pp. 1-3.

Ulmer et al., "Replication as an alternative approach for large segmented telescopes," Proc. SPIE, vol. 4837, Large Ground-based Telescopes, Feb. 2003, pp. 786-794.

Ulmer et al., "Replication as an alternative approach for large segmented telescopes," Proc. SPIE, vol. 5382, 2004, pp. 323-330.

Arzberger et al., "Elastic memory composite technology for thin, lightweight, space- and ground-based deployable mirrors," Proc. SPIE, 5179, Aug. 2003, pp. 143-154.

Cittero et al., "Development of Soft and Hard X-ray optics for astronomy," Proc. SPIE, vol. 4138, 2000, p. 43-56.

Hudec et al., "Lightweight X-ray optics for future space missions," Proc. SPIE, vol. 4851, 2003, pp. 656-665.

* cited by examiner

METHOD OF MAKING OPTICS ELEMENT

This application claims benefits and priority of provisional application Ser. No. 60/582,723 filed Jun. 24, 2004.

CONTRACTUAL ORIGIN OF THE INVENTION

This invention was made with government support under Grant No. NAS1-03007 (NAS5-03069 subcontract from Powermet) awarded by the National Aeronautics Space Administration (NASA) and F49620-02-C-0073 awarded by the Air Force Office of Scientific Research. The government has certain rights in the invention.

FIELD OF THE INVENTION

The present invention relates to a method of making an optics element, such as for example an optical, IR, or X-ray mirror or mirror segment, using a combination of replication and lamination as well as the optics element so produced.

BACKGROUND OF THE INVENTION

There are a great many studies now being performed to design the next generation ground-based telescope such as CELT (reference 1), 20/20 (reference 2), Euro-50 (reference 3), and OWL (reference 4). All of the projects other than 20/20 have a preliminary design with segmented optics similar to the Keck telescope (reference 5) and Hobby-Eberly telescope (reference 6) for the primary mirror design. Regardless of the design, the bottom-line requirement for any new 30-100 meter class telescope is a low-as-possible cost and time to build, so that the project becomes feasible. The conservative approach (of CELT, Euro-50, OWL, etc.) has been to assume the mirrors will be stress figured and polished as was done for the Keck Observatory primary mirror.

Two general approaches to making segmented telescopes have been explored, but only one put into practice for astronomical telescopes. The one that has been put into practice is the use of relatively massive large segments for Keck (1.8 meters in diameter corner-to-corner, 75 mm thick; segment mass 400 kg, aerial density of 190 kg/m$^2$). Each of the 36 Keck segments has its own set of actuators and edge sensors that are adjusted to take out changes in the total mirror figure due to gravity and changes in the orientation of the telescope. It has been found that the system is stable enough that the phasing takes about 1 hour from start to finish and lasts for several weeks. A modified design that uses only spherical segments such as Hobby-Eberly, uses about 1 meter segments and corrects "slow" (days to weeks) changes of the combined segmented primary mirror figure.

The "Keck" approach is "brute force" and requires adaptive optics downstream to achieve the ultimate power of the telescope. A modified version of this approach is to use even larger segments (e.g. 20/20) but effectively this is the same general concept: apply "slow" corrections (for changes that are mechanically/gravitationally induced) to the primary and apply all "fast changes" (for atmospheric turbulence corrections) downstream. At the other extreme, which has not yet been put into use for large (approximately >2 m diameter) astronomical telescopes, is PAMELA (reference 10). PAMELA uses 7 cm segments (8 mm thick and mass of 40-45 gm for an areal density of about 10 kg/m$^2$) and is rapid enough (150 Hz) to correct for variations that affect the performance in the visible (about 600 nm). On one hand, the PAMELA project demonstrated that the basic concept works. On the other hand, the work on PAMELA demonstrated that there are many details that need to be worked out, such as the damping of the pieces and deformation of the figure when actuators are attached. The PAMELA test bed was only a 0.5 meter mirror with 7 cm segments. At least two key issues have to be resolved: the mounting/alignment and keeping the entire segment stiff enough so that 100 KHz AO closed loop control will have a negligible effect on the shape of the segment figure.

There are several areas in which the basic Keck-like approach could be significantly improved to reduce cost. Some examples of areas of improvement are: lighter weight segments to reduce both actuator costs and telescope mount costs; a smaller f number to reduce the dome and other related costs; a different segment fabrication from that used for the Keck Observatory telescope to reduce costs and "time-to-complete."

Since the next generation of optical/IR telescopes will require large numbers of co-phased mirror segments, some form of replication technology is desirable to reduce costs. Electroforming has the advantage that it is a commercially developed technology for replication, and the technology has been widely used for making X-ray mirrors (e.g. XMM-Newton) The use of replication in optics has a long, rich history which has been built upon to this day (see below) by both the X-ray and the optical (primarily) space communities.

Electroforming has been able to achieve $\lambda/2$-$\lambda/4$ at 632 nm, but little has been published in the area of making segments for optical ("normal incidence" optics) mirrors beyond what is in certain web pages (references 12, 13, 14) and J. Denton et al. "Replication of Optical Surfaces: Capabilities and Cautions, in Proceedings of Precision Fabrication and Replication, ASPE, 1999 (reference 11). Much more extensive work has been published for grazing incidence optics, e.g. see references 15-17 and references therein. Replication by composites work has also been carried out extensively (cf. references 18, 19 and references therein), and again, about $\lambda/2$-$\lambda/4$ is the best that has been achieved.

The work on "normal" incidence mirrors can be summarized as follows. Replication offers a significant advantage over classic grinding and polishing, in principle. The advantage is especially true if spherical mirrors are used, but this is not necessary. The figure quality that can be achieved for aspheres has been quoted as about $\lambda/2$-$\lambda/4$ at 632 nm, which is marginally acceptable at 2 µm or longer. The issue of support and mounting for a specific system has not been fully addressed. Workers in the art have tended to focus on one technology such as: composites, electroformed metals, or injection molded Pyrex.

Composite mirrors having two layers have been described by O. Citterio et al. in "Development of Soft and Hard X-ray optics for astronomy", Proceedings of SPIE. Vol. 4138, page 43 (2000) and by O. Citterio et al. in "Development of Soft and Hard X-ray optics for astronomy", Proceedings of SPIE, Vol. 4496, page 23 (2002), and by R. Hudec et al, "Lightweight X-ray optics for future space missions", Proceedings of SPIE, Vol. 4851, page 656 (2003). The composite mirrors are comprised of two layers; i.e. a reflective layer and a ceramic shell. The reflective layer and the ceramic shell are produced separately and then attached to each other by epoxy. There are unbalanced residual stresses in these mirrors due to the fact that the mirrors consist of only two layers. As a result, stiffening rings have to be glued on the ceramic shell external surface to correct out-of-roundness errors that are caused by the presence of residual stresses in the materials.

SUMMARY OF THE INVENTION

The present invention provides a method of making an optics element, such as an optical, IR, or X-ray mirror or mirror segment, by a combination of replication and lamination. The optics element is formed as an in-situ deposited lamination of a first metallic layer, a backing layer on the first metallic layer, and a cover layer on the backing layer. The laminate construction can include combinations of multiple and individual layers selected in order to optimize the performance of the designed mirror.

The optics element is made in an illustrative embodiment of the invention by sequentially depositing the first metallic layer on a replicating surface of a master or mandrel, depositing the backing layer that adheres on the first metallic layer, and depositing the cover layer that adheres on the backing layer. The optics element can be removed from the replicating surface of the master or mandrel using differences in thermal expansion coefficients at low temperatures.

In a further illustrative embodiment of the invention, the first metallic layer is electrodeposited on the replicating surface, the backing layer comprises metal-coated, porous or hollow particles that are plasma sprayed on the first metallic layer to provide a light weight support layer, and the cover layer comprises a metallic layer that is electrodeposited on the backing layer. The metal-coated porous or hollow particles preferably are plasma sprayed on the first metallic layer under conditions that the metallic coating on the particles is melted and remains molten as the particles impinge on the first metallic layer to promote adhesion on the first metallic layer and that the porous or hollow particles are not substantially crushed or densified.

Advantages and features of the invention will become more readily apparent from the following detailed description taken with the following drawings.

DETAILED DESCRIPTION OF THE INVENTION

An aspect of the invention involves a method of making an optics element by a combination of replication and lamination such that the optics element comprises an in-situ deposited composite lamination of a first metallic replicating layer, a backing layer, and a cover layer. For purposes of illustration and not limitation, the optics element can comprise an X-ray mirror or mirror segment, an IR (infrared radiation) mirror or mirror segment, or an optical mirror or mirror segment. For example, X-ray reflecting mirror segments can be made for space-based telescopes at reduced cost for the mirror segments.

Referring to FIGS. 1-4, an illustrative embodiment of the invention will be described below with respect to making an X-ray reflecting mirror or mirror segment. The invention is not limited to this illustrative embodiment, which is offered merely for purposes of illustrating the invention and not limiting it.

Figure 1:
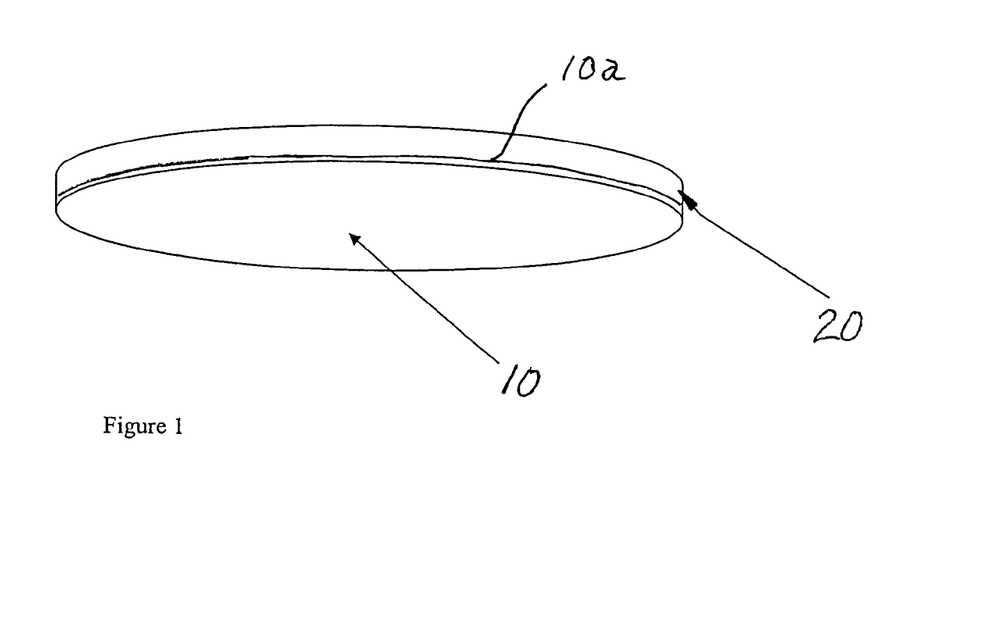
FIG. 1 is a perspective view of a convex master lens having a replicating surface to be imparted to the optics element to be formed and a first nickel layer electroformed on the master lens.

In particular, FIG. 1 shows a convex master lens 10 having a diameter of 10 centimeters and radius of curvature of 210 millimeters. The master lens can be made of T6061 aluminum alloy coated with electroless nickel, any type of stainless steel, or other suitable material.

The master lens 10 includes a smooth replicating surface 10a to be imparted to the optics element to be formed. For example, the replicating surface 10a comprises a highly polished surface having, for example, a average surface roughness, Ra, of 5.5 nm. The replicating surface 10a is polished to this smoothness using any suitable polishing method.

The invention can be practiced using any suitable master or mandrel that has a smooth surface to be imparted to the optics element to be made. The master can have a convex, concave, flat or any other configuration to suit a particular application for the optics element. The mandrel also can have any configuration to suit a particular application for the optics element. For example, a cylindrical or other shape mandrel can be used in practice of the invention.

Referring to FIG. 1, the master lens 10 is shown having a first metallic layer 20 comprising nickel deposited on its replicating surface 10a to a thickness of 20 microns, for example. The first metallic layer 20 preferably is electroformed (electrodeposited) on the replicating surface 10a, although the first metallic layer can, for example, be deposited by other deposition processes, such as e-beam evaporation, physical vapor deposition, or chemical vapor deposition that can replicate the smoothness of the replicating surface 10a of the master lens 10. The master lens can be held in any suitable fixture during deposition of the first metallic layer, backing layer, and second metallic layer.

In practice of the above illustrative embodiment, the nickel layer is conventionally electroformed on the replicating surface 10a using a commercially available nickel sulfamate aqueous solution including 200 g/L of nickel sulfamate, 78 g/L of nickel chloride, 30 g/L of boric acid, and having a pH of 4 to 4.5 and a temperature of 45 degrees C. Electrodeposition of nickel is achieved using a current density of 0.083 amps/square inch with the master lens 10 made the cathode and using a sacrificial anode comprising nickel. The electroformed nickel layer had an average surface roughness, Ra, of 5.5 nm corresponding to that of the master lens replicating surface 10a. The detailed electroforming parameters described above are offered merely for purposes of illustration of the invention and not limitation thereof.

Although the first metallic layer 20 is illustrated as comprising nickel, the first metallic layer can be selected from metals and alloys from the group consisting of nickel, nickel base alloys, chromium, chromium base alloys, aluminum, aluminum base alloys, and others. The invention envisions that the first metallic layer 20 can comprise more than one layer and more than one metal, e.g., an initial metallic layer may be deposited to optimize surface replication and a second metallic layer deposited on the initial layer to optimize adhesion to the backing layer to be deposited. Of course, interlayer adhesion and property compatibility is necessary for this combination. Such combinations of multiple layers can be selected to fulfill the intended function of the first metallic layer.

As mentioned above, the first metallic layer 20 is deposited in a manner to replicate the smoothness of the replicating surface 10a of the master lens 10. Moreover, although the first metallic layer 20 is illustrated as being deposited to a thickness of 20 microns, the first metallic layer 20 can be deposited to any suitable thickness. For purposes of illustration and not limitation, the thickness of the first metallic layer typically is in the range of about 15 to about 50 microns.

Figure 2:
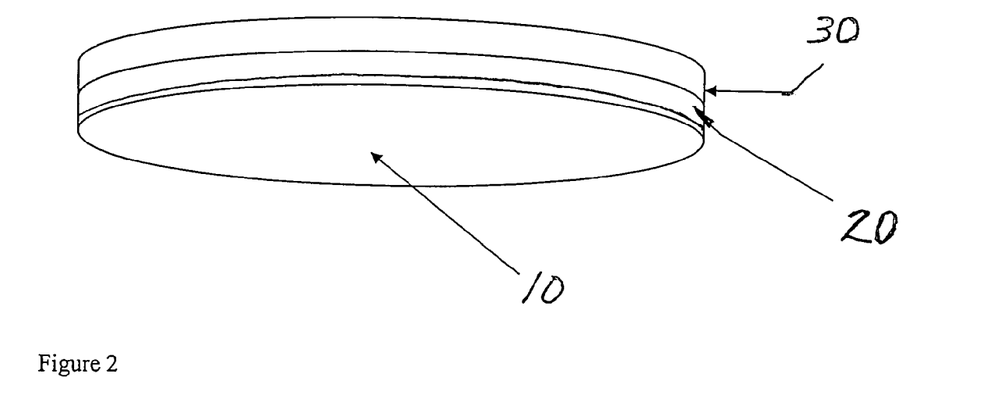
FIG. 2 is a perspective view of the convex master lens having the first nickel layer electroformed and a light weight backing layer plasma sprayed on the first metallic layer.

Referring to FIG. 2, a light weight (low density) backing layer 30 is shown deposited on the first metallic layer 20 in a manner to adhere thereto and provide structural support to the first metallic layer. The as-deposited backing layer 30 preferably comprises porous or hollow ceramic or refractory (non-metallic) particles distributed in a metallic matrix formed by a metallic coating on the individual particles before they are deposited as described below.

In the illustrative embodiment, the backing layer 30 is deposited on the electroformed nickel layer 20 by plasma spraying a mixture of nickel coated, porous ceramic particles available as Powdermet G850 microspheres (23% by weight Ni, less than 90 microns particle diameter) and as Powdermet G850 (batch B040914) microspheres (12% by weight Ni, less than 325 mesh to greater 500 mesh particle size). These nickel coated, porous microspheres are commercially available from Powdermet, Inc. of Euclid, Ohio. Nickel coated, hollow microspheres are also commercially available from Powdermet, Inc. and can be used in practice of the invention The Powdermet G850 microspheres include a nickel coating on the individual alumino-silicate ceramic microspheres wherein the Ni is present in an amount of 23 weight percent. The Powdermet G850 (batch B04094) microspheres include a nickel coating on the individual alumino-silicate ceramic microspheres wherein the Ni is present in an amount of 12 weight percent. The higher nickel content coated microspheres are employed to improve adhesion of the plasma sprayed backing layer 30 on the electroformed nickel layer 20. The lower nickel content coated microspheres are employed to reduce the density of the composite, while minimizing loss of strength in the composite structure. Coated particles having a range of Ni contents and/or a single nickel content may also be used to optimize the composite laminate properties.

In practice of the above illustrative embodiment, the backing layer 30 is plasma sprayed using a Metco 4F plasma spray gun having a nozzle diameter of 6 mm operated at a power level of 20 kW using argon gas flow of 40 slm and hydrogen gas flow of 5 slm. The spray distance is 100 mm.

A Metco twin feeder powder system is used to supply the mixture of the Powdermet G850 microspheres and the Powdermet G850 (B04094) microspheres through an orifice diameter of 1.5 mm with the orifice offset from the nozzle of the spray gun by 7 mm. The twin feeder powder system is operated at a disc speed of 10%, a carrier gas feed of 6 slm, and stirrer speed of 50%.

These plasma spray parameters are selected to cause the nickel coating on the ceramic microspheres to melt and remain melted (molten) as the particles impinge on the first metallic layer 20 to promote adhesion on the first metallic layer without softening or melting the porous ceramic microspheres to an extent that they are substantially crushed or densified when they impinge on the first metallic layer. That is, the plasma spray parameters are selected such that most of the porous ceramic microspheres are not crushed or densified by impingement on the first metallic layer. The backing layer 30 so produced has an impressive areal mass density of just 0.5 kg-m$^{-2}$.

In addition, these parameters are selected to control heat input to the first metallic layer 20 and the master lens 10 in a manner to reduce or avoid internal or interlayer stresses from differential thermal expansion stresses and concomitant distortions. The master lens 10 and first metallic layer 20 can be plasma sprayed at ambient temperature without cooling of any kind, or they can be cooled by flowing cooling air across the back of a fixture holding the master lens during plasma spraying of the backing layer 30 to this end. Further, the master lens 10 and first metallic layer 20 may be preheated above room temperature, such as for example up to about 80 degrees C., to this end depending upon the size, shape, and geometry of master or mandrel and spray pattern and other plasma spray parameters that may used.

For purposes of illustration and not limitation, the backing layer 30 is deposited to a thickness of about 100 to about 500 micrometers. The as-plasma-sprayed backing layer 30 comprises the porous ceramic microspheres distributed in a nickel matrix formed by the melted nickel coating on the individual microspheres solidifying after impingement on the first metallic layer. The sprayed backing layer 30 adheres to the electroformed nickel layer and does not de-laminate even when immersed in liquid nitrogen. The nickel matrix is metallurgically and mechanically bonded to the electroformed nickel layer 20.

Although the backing layer 30 is illustrated as being deposited by plasma spraying the nickel coated ceramic microspheres, the invention is not so limited since the backing layer can comprise any suitable metallic coated, hollow or porous ceramic or refractory (non-metallic) particles to provide a light weight backing or support layer for the first metallic layer. Metallic coated ceramic or refractory particles useful in practice of the invention include, but are not limited to, porous mullite particles and alumina particles as ceramics and carbon particles and graphite particles as refractories. Non-porous (solid) particles of these and other materials (such as boron carbide) can also be used to form the backing layer to the extent that they meet the specifications of the mirrors in terms of density and strength, and lend themselves to economical processing. Materials such as polymers have low melting points and metals such as magnesium are readily oxidized and are thus typically not suitable for the atmospheric plasma spray process used in this illustrative embodiment. While suitable deposition techniques can be devised for such materials that would take account of these limitations, the properties of the first metallic layer and the backing layer made of such materials would nevertheless need to be selected to be compatible and provide satisfactory interlayer adhesion.

Preferably, the metallic coating on the ceramic or refractory particles comprises the same metal as the first metallic layer to improve adhesion therewith. Moreover, although the backing layer 30 is illustrated as being deposited by plasma spraying, the invention envisions using other deposition processes to deposit the backing layer in a manner to adhere on the first metallic layer 20 such as, for example, casting or otherwise providing the backing layer particles on the first metallic layer with or without a polymer or other curable binder followed by curing of the binder to form interparticle and interlayer bonds; providing the backing layer particles on the first metallic layer followed by low temperature diffusion bonding of the metallic coating of the backing layer particles to the first metallic layer; providing the backing layer particles with a brazing alloy particle coating on the first metallic layer followed by heating to form a brazed interlayer joint; or other deposition technique that provides an interlayer bond.

Figure 3:
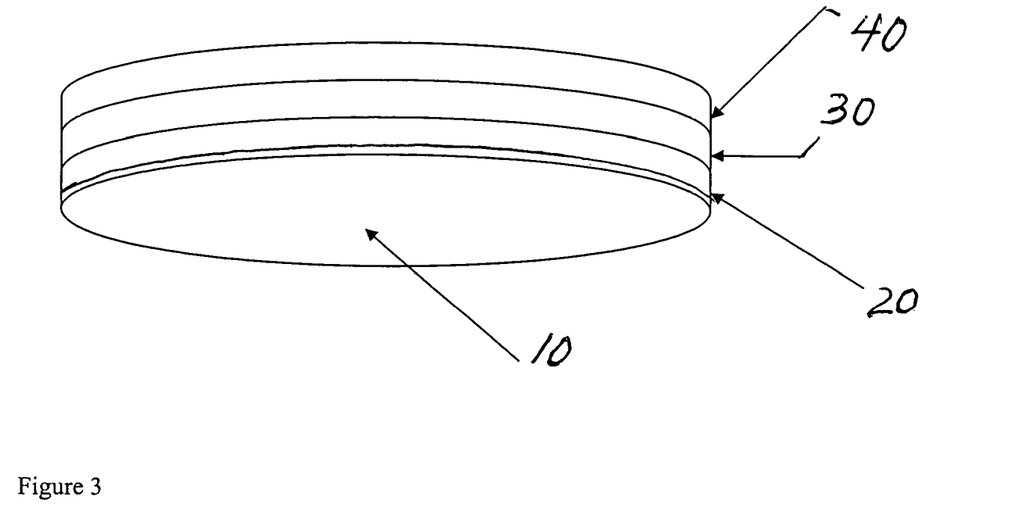
FIG. 3 is a perspective view of the convex master lens having the first nickel layer electroformed, the backing layer plasma sprayed on the first metallic layer, and a metallic cover layer electroformed on the plasma sprayed support layer to form a composite lamination.

Referring to FIG. 3, a cover layer 40 is shown deposited on the backing layer 30 to seal the low density, porous backing layer from the environment, add strength to the lamination, and balance lamination residual stresses. The cover layer 40 preferably comprises a second metallic layer, such as nickel deposited on the backing layer to a thickness of about 15 to about 50 microns, in a manner to substantially reduce or eliminate residual stresses in the optics element 100. For example, the composite lamination forming the optics element 100 may exhibit a net compressive stress or zero stress such that the optics element is not distorted and does not require any external stiffening to correct out-of-roundness errors.

Moreover, the cover layer 40 reduces the mass loss in vacuum by a factor of 2 as compared to a material with open porosity that is not sealed. The prevention of mass loss or gain stabilizes the optics element. A metallic cover layer preferably is electrodeposited on the backing layer 30 in a manner to adhere thereto, although the metallic layer can be deposited by other deposition processes, such as electroless deposition (for metals such as Ni). In lieu of a metallic cover layer 40, the invention envisions using a cover layer that comprises a non-metallic material such as for example a polymer material or an oxide material as long as the property match is suitable for the desired mirror performance. For example, it may be possible to deposit a polymer-based epoxy seal coat or layer as the above cover layer 40 on the backing layer 30. Alternately, a solution-gel deposition technique may be used to deposit a continuous layer of, for example, silica or alumina as the above cover layer 40 on the backing layer 30 depending upon its porosity.

In the above illustrative embodiment, the nickel cover layer is conventionally electrodeposited to a thickness of 20 microns on the backing layer 30 using the commercially available nickel sulfamate aqueous solution and deposition parameters described above and employed to deposit the first metallic layer 20, which are offered merely for purposes of illustration of the invention and not limitation thereof.

Although the metallic cover layer 40 is illustrated as comprising nickel, the metallic layer can be selected from metals and alloys selected from the group consisting of nickel, nickel-base alloys, copper, copper-base alloys, cobalt, cobalt-base alloys, or other electroplatable metals. Preferably, the metallic cover layer 40, the metallic coating on the ceramic or refractory particles of the backing layer 30, and the metallic first layer 20 are the same or similar or compatible enough to adhere to one another.

Moreover, although the cover layer 40 is illustrated as being deposited to a thickness of 20 microns, it can be deposited to any suitable thickness depending upon the material used for the cover layer. For purposes of illustration and not limitation, the thickness of the above metallic cover layer typically is in the range of about 15 to about 50 microns.

Figure 4:
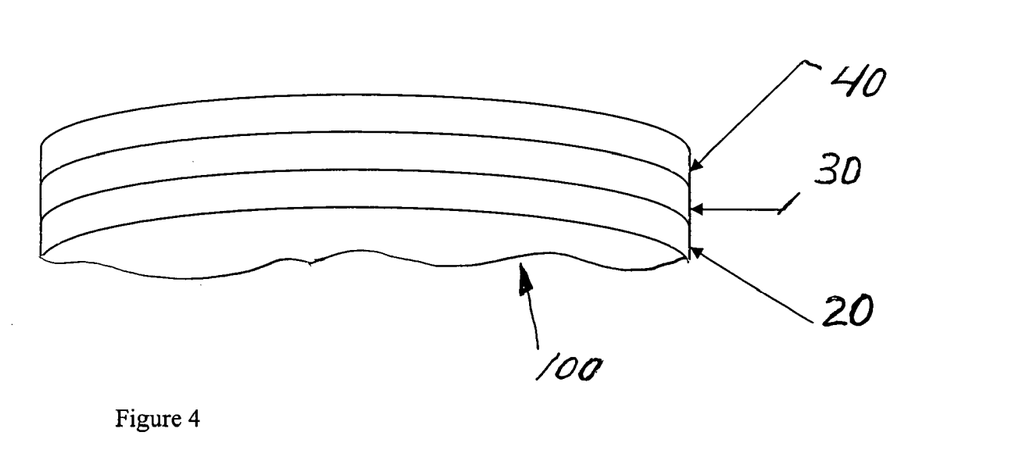
FIG. 4 is a partial perspective view of the optics element after the master lens has been removed and formed as an in-situ deposited lamination of the first metallic layer, the backing layer on the first metallic layer, and the cover layer on the backing layer.

As is apparent, the optics element 100 is formed as an in-situ deposited composite lamination of the first metallic layer 20, the backing layer 30, and the cover layer 40, FIG. 4. The optics element 100 can be removed from the replicating surface 10a using differences in thermal expansion coefficients between the optics element 100 and the master or mandrel.

For example, in the illustrative embodiment, the master lens 10 having the first metallic layer 20, the backing layer 30, and the cover layer 40 deposited in-situ thereon (constituting the optics element 100) can be immersed in ethyl alcohol that is chilled with dry ice. After immersion, the master or mandrel shrinks more than the optics element 100, allowing its removal from the replicating surface 10a. The alcohol acts as a lubricant during the removal process.

The optics element (mirror) 100 pursuant to the invention is produced as a one-piece, light weight, strong optics element that is substantially free of residual stresses to the extent that no stiffening rings are required to correct out-of-roundness.

An example of potential use of mirror segments pursuant to the invention is now described. In particular, a large segmented telescope of the 30-100 meter class to meet the requirements for making a deep galaxy survey is being designed. The telescope requires measurements in the approximate 2 µm to 300 µm range and a telescope with approximately 1000 $m^2$ collecting area (36 m diameter). Furthermore, approximate 0.2 inch angular resolution is required. Atmospheric turbulence necessitates the use of corrective adaptive optics (AO; for an introduction and references to material on AO see references 8 and 9). The AO is required even in K-band (2.2 µm) to get 0.2 inch over a field of view (FOV) of 1-2 feet. For comparison, the diffraction limit of a 36 m telescope at 2 µm is about 0.01 inch. The inventors have selected the segment size to be less than or equal to the Fried correlation length at 2µ. By making the segments low mass (10-20 kg/$m^2$), the present invention can achieve another desirable goal: to apply the AO to the primary (primary mirror AO; PMAO) as PMAO is the optimum place to apply the atmospheric correction. For example, the primary is closest to where the atmospheric distortion actually takes place, and AO actuators can also be used to correct for wind and gravitational loading effects at the same time.

If a hexagonal segment 0.5 m, corner to corner, is assumed, there is a segment area of about 0.16 $m^2$ so that for a 36 m diameter telescope, about 6,000 segments are required. This leads to a requirement of producing 10 segments per day in order to make all the segments in 3 years, assuming that 200 days per year are available to make segments. Use of the replication and lamination process pursuant to the invention permits the segments to be made thin; i.e. they do not have to be thick enough to be able to be ground and polished.

The replication and lamination method pursuant to the invention can be used for reducing the cost and fabrication time. And, a by-product of making a low mass segment (which in turn requires lower mass/less powerful actuators) is that the overall telescope mounting system, segment supports and actuator costs will be reduced. Furthermore, an additional cost saving can be gained by being able to design the pieces of the desired f/number of the telescope (this is usually 1 or lower).

If the replication and lamination method pursuant to the invention is used, the f/number can be relatively arbitrary, as the grinding and polishing of a few thick masters can be customized to meet the figure requirements.

To summarize, the replication and lamination method pursuant to the invention is desirable for several reasons:
1. reduced focal length
2. reduced areal density
3. reduced time to fabricate
4. reduced amount of grinding and polishing
5. reduced cost of improving image plurality by primary mirror AO
6. reduced cost of the actuators needed for the entire system.

The optics element made pursuant to the invention may be subjected to polishing and figuring as may be required in certain situations. The invention is advantageous to produce an optics element that is "close enough" to final shape that the polishing and figuring will not cause stress relief to significantly change the shape of the element.

Although certain detailed embodiments of the invention are described herein, those skilled in the art will appreciate that the invention is not limited to these embodiments but only as set forth in the following claims.

REFERENCES

1. J. E. Nelson, "Design concepts for the California Extremely Large Telescope (CELT)," in *Proc. SPIE Vol.* 4004, p. 282-289, *Telescope Structures, Enclosures, Controls, Assembly/Integration/Validation, and Commissioning*, Thomas A. Sebring; Torben Andersen; Eds., 4004, pp. 282-289, August 2000.
2. R. Angel, M. Loyd-Hart, K. Hege, R. Sarlot, and C. Peng, "The 20/20 telescope: MCAO imaging at the individual and combined foci," in *Beyond Conventional Adaptive Optics, Proceeding ESO, Venice*, (http://caao.as.arizona.edu/publications/venice2020.pdf), 2001.
3. T. Ardeberg, M. Owner-Petersen, and A. Gontcharov, "Concepts for Dual Conjugate Adaptive Optics for the Swedish 50 m Extremely Large Telescope," in *Beyond Conventional Adaptive Optics, Proceeding ESO, Venice*, (http://www.astro.lu.se/torben/euro50/), 2001.
4. P. Dierickx and R. Gilmozzi, "Progress of the OWL 100-m telescope conceptual design," in *Proc. SPIE Vol.* 4004, p. 290-299, *Telescope Structures, Enclosures, Controls, Assembly/Integration/Validation, and Commissioning*, Thomas A. Sebring; Torben Andersen; Eds., 4004, pp. 290-299, August 2000.
5. J. E. Nelson and P. R. Gillingham, "Overview of the performance of the W. M. Keck Observatory," in *Proc. SPIE Vol.* 2199, p. 82-93, *Advanced Technology Optical Telescopes V*, Larry M. Stepp; Ed., 2199, pp. 82-93, June 1994.
6. M. T. Adams, J. A. Booth, G. M. Hill, and L. W. Ramsey, "Performance testing of the Hobby-Eberly Telescope primary mirror array," in *Proc. SPIE Vol.* 4004, p. 471-481, *Telescope Structures, Enclosures, Controls, Assembly/Integration/Validation, and Commissioning*, Thomas A. Sebring; Torben Andersen; Eds., 4004, pp. 471-481, August 2000.
7. M. P. Ulmer, E. D. Kibblewhite, T. Heter, D. A. Harper, R. Kron, J. Mohr, L. A. Thompson, J. Tumlinson, and D. D. York, "Large Telescope Project Dedicated to an Orgins Survey," in *Proc. SPIE, Extermely Large Telscopes*, this conference, 2003.
8. J. Zuther, Basic Principles of Adaptive Optics, World Wide Web, http://www.ph1.uni-koeln.de/workgroups/obs_astronomy/ao_sample/introA0.%html#top, 2000-2002.
9. C. Max, *Center for Adaptive Optics*, World Wide Web, http://cfao.ucolick.org/ao/index.shtml, 2000-2002.
10. J. M. Rakoczy, E. E. Montgomery, and J. L. Lindner, "Recent enhancements of the Phased Array Mirror Extendible Large Aperture (PAMELA) telescope testbed at MSFC," in *Proc. SPIE Vol.* 4004, p. 352-362, *Telescope Structures, Enclosures, Controls, Assembly/Integration/ Validation, and Commissioning*, Thomas A. Sebring; Torben Andersen; Eds., 4004, pp. 352-362, August 2000.
11. J. Denton and A. E. Gee, "Replication of Optical Surfaces: Capabilities and Cautions," in *Proceedings of: Precision Fabrication and Replication, ASPE*, 1999.
12. A. Valenzuela, G. Valsecchi, and R. Bahanam, *Cost Effective Ultra Light Weight Mirrors*, World Wide Web, http://origins.jpl.nasa.gov/meetings/ulsoc/papers/valenzuela.pdf, 2000-2002.
13. J. Redmon, *Electroformed Nickel Mirrors for NGST*, World Wide Web, http://www.ngst.nasa.gov/project/Groups/Technology/bin/Redmon.pdf, 1997-2002.
14. D. Ila, *Production of Ultra Light-Weight Mirrors*, World Wide Web, http://cim.aamu.edu/Activities/pulm_lab.htm, 2001-2002.
15. O. Citterio, M. Ghigo, F. Mazzoleni, G. Pareschi, G. Parodi, H. W. Braeuninger, W. Burkert, and G. D. Hartner, "Development of soft and hard x-ray optics for astronomy: progress report II and considerations on material properties for large-diameter segmented optics of future missions," in *Proc. SPIE Vol.* 4496, p. 23-40, *X-Ray Optics for Astronomy: Telescopes, Multilayers, Spectrometers, and Missions*, Paul Gorenstein; Richard B. Hoover; Eds., 4496, pp. 23-40, January 2002.
16. B. Aschenbach, "In-orbit performance of the XMM-Newton x-ray telescopes: images and spectra," in *Proc. SPIE Vol*, 4496, p. 8-22, *X-Ray Optics for Astronomy: Telescopes, Multilayers, Spectrometers, and Missions*, Paul Gorenstein; Richard B. Hoover; Eds., 4496, pp. 8-22, January 2002.
17. M. P. Ulmer, R. I. Altkron, M. E. Graham, A. Madan, and Y. S. Chu, "Production and performance of multilayer coated conic sections," in *Proc. SPIE Vol.* 4496, p. 127-133, *X-Ray Optics for Astronomy: Telescopes, Multilayers, Spectrometers, and Missions*, Paul Gorenstein; Richard B. Hoover; Eds., 4496, pp. 127-133, January 2002.
18. R. K. Heilmann, G. P. Monnelly, O. Mongrard, N. Butler, C. G. Chen, L. M. Cohen, C. C. Cook, L. M. Goldman, P. T. Konkola, M. McGuirk, G. R. Ricker, and M. L. Schattenburg, "Novel methods for shaping thin-foil optics for x-ray astronomy," in *Proc. SPIE Vol.* 4496, p. 62-72, *X-Ray Optics for Astronomy: Telescopes, Multilayers, Spectrometers, and Missions*, Paul Gorenstein; Richard B. Hoover; Eds., 4496, pp. 62-72, January 2002.
19. R. C. Romeo, A. B. Meinel, M. P. Meinel, and P. C. Chen, "Ultralightweight and hyperthin rollable primary mirror for space telescopes," in *Proc. SPIE Vol.* 4013, p. 634-639, *UV, Optical, and IR Space Telescopes and Instruments*, James B. Breckinridge; Peter Jakobsen; Eds., 4013, pp. 634-639, July 2000.
20. R. Willingale, B. Aschenbach, H. Kunieda, and K. Yamashita, *XEUS Mirror Technology*, World Wide Web, http://astro.esa.int/SA-general/Projects/XEUS/technology/technology_04.%html, 1999-2002.
21. M. P. Ulmer, R. A. Stern, L. Shing, and M. Farber, "Deformable x-ray optics for solar physics," in *Proc. SPIE in press*, 5171-33, 2004.
22. G. T. van Belle, W. M. Keck *Telescope Data*, World Wide Web, http://huey.jpl.naea.gov/gerard/work_tour/keck_data.html, 1996-2002.
23. G. Chanan, *Phasing The Keck Telescope*, World Wide Web, http://www.pa.uci.edu/physics/news/chanan.html, 1998-2002.
24. M. P. Ulmer, R. I. Altkorn, E. D. Kibblewhite, and S. Varlese, "Replication as an alternative approach for large segmented telescopes," in *Large Ground-based Telescopes*. Edited by Oschmann, Jacobus M.; Stepp, Larry M. Proceedings of the SPIE, Volume 4837, pp. 786-794 (2003) ., pp. 786-794, February 2003.
25. S. C. Arzberger, M. Munshi, M. Lake, M. Ulmer, and S. Varlese, "Elasctic memory composite technology for thin, lightweight, space- and ground-based deployable mirrors," in *Proc. SPIE in press*, 5179-23, August 2004.

We claim:

1. A method of making an optics element, comprising depositing a first metallic layer on a polished replicating surface to be imparted to the optics element, depositing a backing layer comprising metallic coated porous or hollow particles on the first metallic layer deposited on the replicating surface in a manner that the backing layer particles are adhered on the first metallic layer by a metallic bond without the particles being substantially crushed or densified, depositing a cover layer on the backing layer deposited on the first metallic layer in a manner that the cover layer adheres on the backing layer, whereby the first metallic layer, the backing layer, and the cover layer form a composite lamination residing on the replicating surface, and removing the composite lamination as the optics element from the replicating surface wherein the polished replicating surface is imparted to a surface of the first metallic layer.

2. The method of claim 1 wherein the first metallic layer comprises one or multiple metallic layers.

3. The method of claim 1 including electrodepositing the first metallic layer on the replicating surface.

4. The method of claim 1 wherein the backing layer comprises the metallic coated porous or hollow particles that are plasma sprayed on the first metallic layer.

5. The method of claim 4 wherein the metallic coating on the particles comprises the same metal as the first metallic layer.

6. The method of claim 4 wherein the particles comprise porous or hollow ceramic microspheres or porous or hollow non-metallic refractory microspheres.

7. The method of claim 4 wherein the metallic coated particles are plasma sprayed on the first metallic layer under conditions that the metallic coating on the particles is melted and remains molten as the particles impinge on the first metallic layer to promote adhesion on the first metallic layer.

8. The method of claim 7 wherein the metallic coated particles are plasma sprayed on the first metallic layer under conditions that the particles are not substantially crushed or densified.

9. The method of claim 1 including depositing the cover layer as a metallic layer on the backing layer.

10. The method of claim 9 wherein the first metallic layer and the metalllc cover layer comprise the same metallic material.

11. The method of claim 10 wherein the metallic material is selected from the group consisting of nickel and nickel base alloys.

12. The method of claim 1 including depositing the cover layer as a non-metallic layer on the backing layer.

13. The method of claim 1 wherein the replicating surface is provided on a master or mandrel on which the first metallic layer is deposited.

* * * * *

UNITED STATES PATENT AND TRADEMARK OFFICE
CERTIFICATE OF CORRECTION

PATENT NO. : 7,874,060 B2
APPLICATION NO. : 11/165610
DATED : January 25, 2011
INVENTOR(S) : Ulmer et al.

Page 1 of 1

It is certified that error appears in the above-identified patent and that said Letters Patent is hereby corrected as shown below:

Column 1, replace the second paragraph, lines 8-13; CONTRACTUAL ORIGIN OF THE INVENTION with the following paragraph.
This invention was made with government support under contract number NAS5-03069 (subcontract from Powdermet) awarded by the National Aeronautics Space Administration; and contract number NAS1-03007 (subcontract from Ball Aerospace & Technologies Corp.) awarded by the National Aeronautics Space Administration; and grant number F49620-02-C-0073 from the Air Force Office of Scientific Research. The government has certain rights in the invention.

Signed and Sealed this
Twenty-seventh Day of September, 2011

David J. Kappos
*Director of the United States Patent and Trademark Office*